US008472588B2

(12) United States Patent
Kim et al.

(10) Patent No.: US 8,472,588 B2
(45) Date of Patent: Jun. 25, 2013

(54) EMERGENCY CALL SERVICE SYSTEM IN IP NETWORK AND METHOD THEREOF

(75) Inventors: Eun Joo Kim, Seoul (KR); Soon Seok Lee, Daejeon (KR)

(73) Assignee: Electronics And Telecommunications Research Institute, Daejeon (KR)

( * ) Notice: Subject to any disclaimer, the term of this patent is extended or adjusted under 35 U.S.C. 154(b) by 1639 days.

(21) Appl. No.: 11/926,733

(22) Filed: Oct. 29, 2007

(65) Prior Publication Data

US 2008/0112544 A1    May 15, 2008

(30) Foreign Application Priority Data

Nov. 15, 2006   (KR) ........................ 10-2006-0112813

(51) Int. Cl.
*H04M 11/04* (2006.01)
(52) U.S. Cl.
USPC .................................. 379/45; 379/38; 379/42
(58) Field of Classification Search
USPC ...................................................... 379/37–51
See application file for complete search history.

(56) References Cited

U.S. PATENT DOCUMENTS

| 6,690,675 | B1 * | 2/2004 | Kung et al. ................... 370/401 |
| 2007/0036283 | A1 * | 2/2007 | Shaffer et al. ................. 379/67.1 |
| 2007/0118616 | A1 * | 5/2007 | Simongini et al. ............ 709/219 |
| 2008/0101551 | A1 * | 5/2008 | Tatman et al. .................. 379/45 |
| 2010/0020942 | A1 * | 1/2010 | Olshansky et al. ............. 379/45 |

FOREIGN PATENT DOCUMENTS

| JP | 2006005504 | 1/2006 |
| JP | 2006216994 | 8/2006 |
| KR | 1020010105542 | 11/2001 |
| KR | 1020020052503 | 7/2002 |
| KR | 1020040041267 | 5/2004 |
| KR | 1020040090023 | 10/2004 |
| KR | 1020070027858 | 3/2007 |

* cited by examiner

*Primary Examiner* — Duc Nguyen
*Assistant Examiner* — Ibraham Sharifzada
(74) *Attorney, Agent, or Firm* — Ladas & Parry LLP

(57) ABSTRACT

An emergency call service system in an Internet Protocol (IP) network and a method thereof are provided. The system includes a policy control server, an emergency call agent, a call agent, and a network manager. The policy control server generates position information of a user terminal by mapping an IP address and local information to an identification (ID) of the user terminal. The emergency call agent detects a suitable emergency center for the user terminal sending an emergency call, and makes an emergency-call connection between the user terminal and the emergency center. The call agent relays the emergency call of the user terminal to the emergency call agent. The network manager stores position information of the user terminal generated through the policy control server, provides the emergency call agent with the position information of the user terminal sending the emergency call, and performs a resource reservation for the emergency-call connection.

9 Claims, 6 Drawing Sheets

EMERGENCY CALL SERVICE SYSTEM IN IP NETWORK AND METHOD THEREOF

CROSS-REFERENCE TO RELATED APPLICATIONS

This application claims the priority of Korean Patent Application No. 10-2006-0112813, filed on Nov. 15, 2006, in the Korean Intellectual Property Office, the disclosure of which is incorporated herein by reference.

BACKGROUND OF THE INVENTION

1. Field of the Invention

The present invention relates to an emergency call service system in an IP network and a method thereof, and more particularly, to an emergency call service system in an IP network, which is configured to provide an emergency call service in an IP network, and a method thereof.

This work Was supported by the IT R&D program of MIC/IITA[2005-S-097-02, Development of BcN Integrated Network Control and QoS/TE Management Technology]

2. Description of the Related Art

To provide an emergency call service in the Internet Protocol (IP) network, a position of a user needs to be detected, and the quality of service (QoS) between the user and an emergency center must be ensured.

When a user terminal having an IP address requests an emergency call connection to an emergency center in the IP network, a call agent (CA) must ensure a connection to the nearest emergency center from a position of a calling party especially because the calling party is in an emergency situation.

For example, an IP multimedia subsystem (IMS) terminal automatically registers its position to a base station, so that the call agent can connect the terminal to the nearest emergency center with reference to the registered position information. However, a non-IMS terminal does not support this automatic registration function, and thus the call agent cannot detect a position of the non-IMS terminal, thereby failing to make an emergency call connect between the terminal and the emergency center.

FIG. 1 illustrates a configuration of a conventional emergency call service system in an IP network.

The conventional emergency call service system includes a user terminal 111, first and second concentrators 112 and 113, access and edge routers 114 and 115, and an emergency center 116 in each of areas 110. The emergency call service system further includes call agents (CA) 150 connected to the respective edge routers 115 of the areas 110.

The user terminal 111 is an IMS terminal having an IP address. The user terminal 111 registers its position information to a base station (not shown), and then provides a user with services such as a Voice over Internet Protocol (VoIP) and a Multimedia over IP (MmoIP), and an emergency call service.

The first and second concentrators 112 and 113 each is implemented as a digital subscriber line access multiplexer (DSLAM). The first and second concentrators 112 and 113 multiplex signals received from a plurality of user terminals 111, and transmit to a high-speed backbone circuit.

The access router 114 performs routing between the second concentrator 113 and the edge router 115, and transmits a signal of the second concentrator 113 to the edge router 115. The edge router 115 transmits the signal transmitted from the access router 114 to the call agent 150 or another communication party in another network.

The emergency center 116 performs an emergency call connection to the user terminal 111 under control of the call agent 150, and provides a user with required services.

The call agent 200 is connected to a plurality of user terminals 111. When a specific user terminal 111 requests a service, the call agent 200 detects a proper communication party and relays the service. Particularly, when the specific user terminal 111 sends an emergency call, the call agent 200 detects a position of the corresponding user terminal 111 by using a base station, and then connects an emergency call between the corresponding user terminal 111 and the nearest emergency center 116.

As described above, when the user terminal is the IMS terminal, the conventional emergency call service system can provide an emergency call service by determining a position of the user terminal through the base station. However, in the case of the non-IMS terminal, the emergency call service cannot be provided at all because of the absence of a terminal-position detection unit.

SUMMARY OF THE INVENTION

An aspect of the present invention provides an emergency call service system in an Internet Protocol (IP) network, which is configured to provide an emergency call service to every user terminal having an IP address, and a method thereof.

According to an aspect of the present invention, there is provided an emergency call service system in an Internet Protocol (IP) network, including: a policy control server for generating position information of a user terminal by mapping an IP address and local information to an identification (ID) of the user terminal; an emergency call agent for detecting a suitable emergency center for the user terminal sending an emergency call, and make an emergency-call connection between the user terminal and the emergency center; a call agent for relaying the emergency call of the user terminal to the emergency call agent; and a network manager for storing position information of the user terminal generated through the policy control server, provide the emergency call agent with the position information of the user terminal sending the emergency call, and perform a resource reservation for the emergency-call connection.

According to another aspect of the present invention, there is provided an emergency call service method in an Internet Protocol (IP) network, including: generating, at the policy control server, position information of the user terminal by mapping an IP address and local information to an identification (ID) of the user terminal, and storing the generated position information in the network manager; relaying, at the call agent, an emergency call of the user terminal to the emergency call agent; detecting, at the emergency call agent, a position of the user terminal on the basis of the position information of the user terminal stored in the network manager, and determining an emergency center suitable for the user terminal; and making, at the emergency call agent, an emergency call connection between the user terminal and the emergency center.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
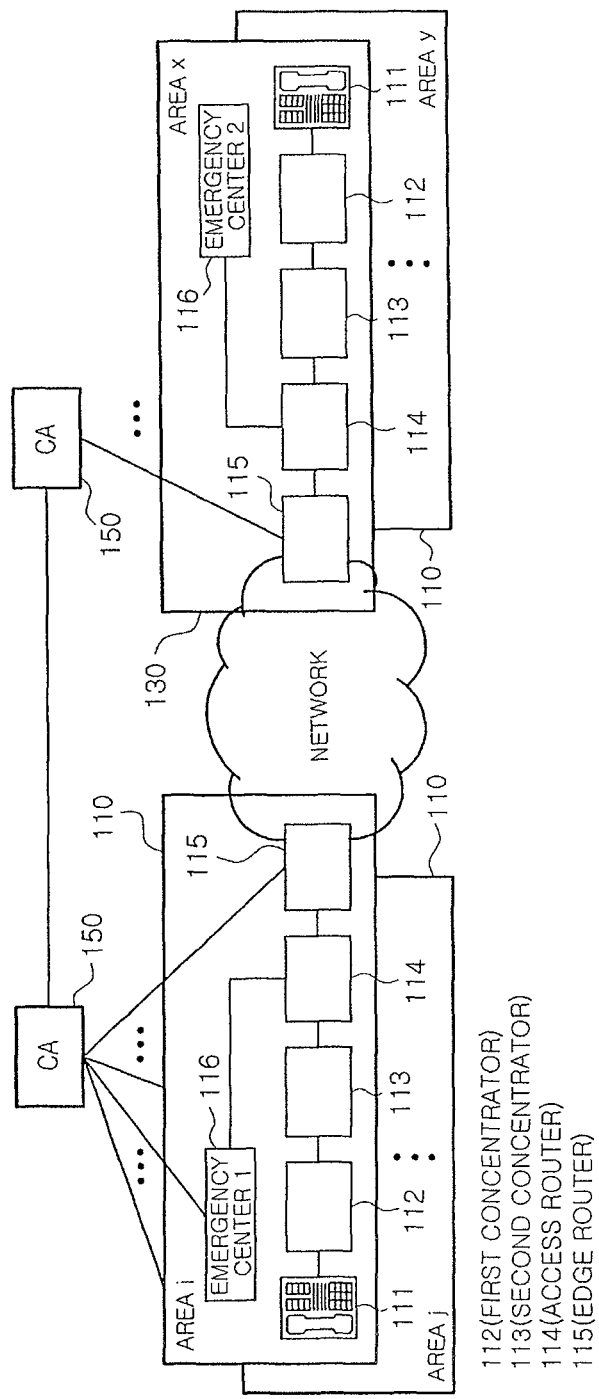
FIG. 1 illustrates a configuration of a conventional emergency call service system in an IP network.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Therefore, in some embodiments, well-known processes, device structures, and technologies will not be described in detail to avoid ambiguousness of the present invention. An embodiment described and exemplified herein includes a complementary embodiment thereof.

Like reference numerals refer to like elements throughout.

Figure 2:
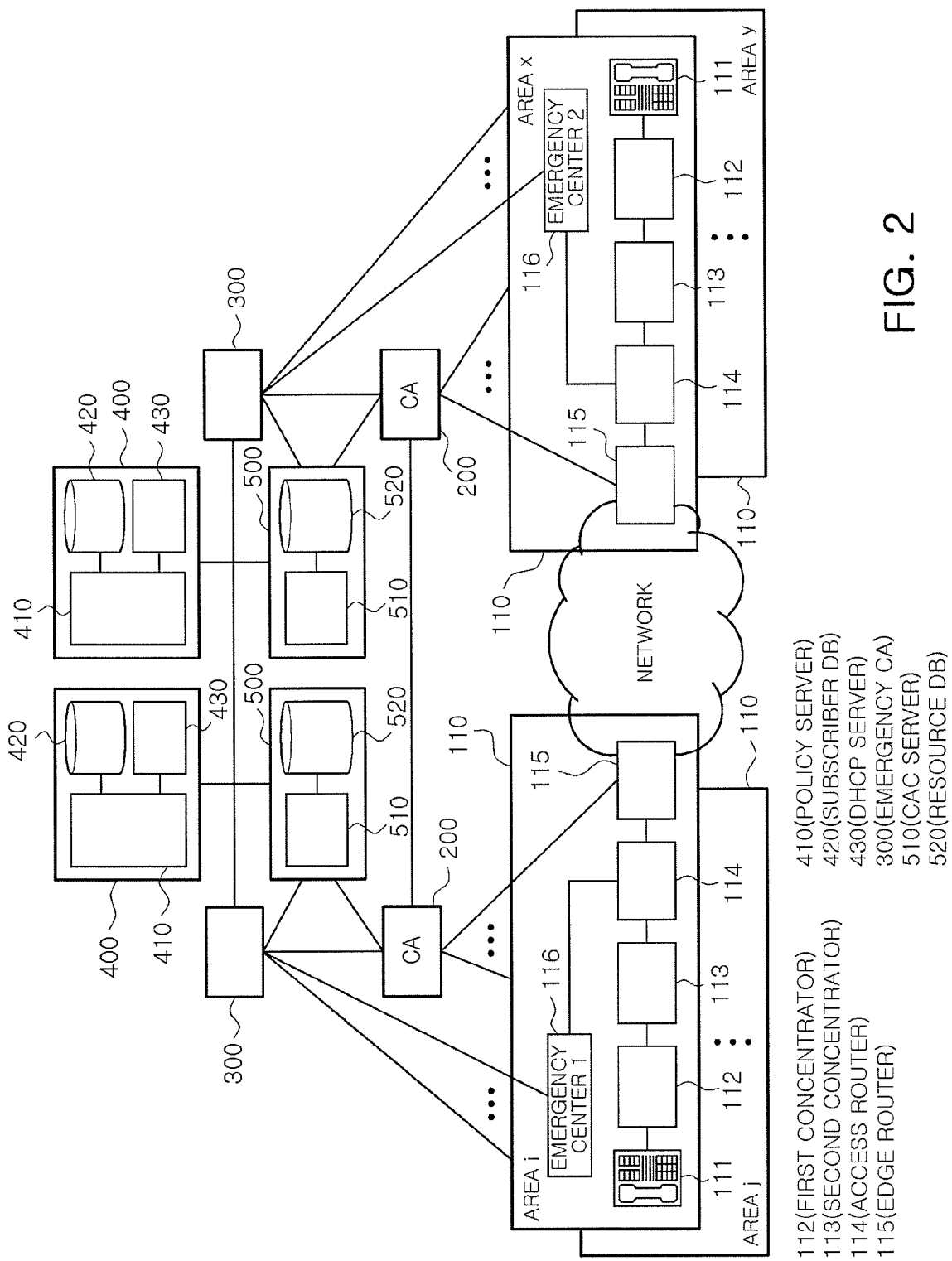
FIG. 2 illustrates a configuration of an emergency call service system in an IP network according to an embodiment of the present invention.

FIG. 2 illustrates a configuration of an emergency call service system according to an embodiment of the present invention.

Referring to FIG. 2, the emergency call service system includes a user terminal 111, first and second concentrator 112 and 113, access and edge routers 114 and 115, and an emergency center 116 in each of areas 110. Also, the emergency call service system further includes call agents (CA) 200, emergency call agents 300, policy control systems 400, and network management systems 500.

In here, the call agents 200 are connected to the respective routers 150 of the areas 110. The emergency call agents 300 are connected to the respective call agents 200, a plurality of emergency centers 116, and another emergency call agent 300. The policy control systems 400 are connected to the respective call agents 200 and the respective network management systems 500. The network management systems 500 are connected to the respective emergency call agents 300 and the respective policy control systems 400.

The user terminal 111 may be any type of IP terminal having an IP address such as an IP multimedia subsystem (IMS) terminal and a non-IMS terminal. Such a user terminal 111 provides a user with an emergency call service as well as services such as VoIP and MMoIP. An emergency call request for an emergency call service can be made by indicating an emergency call in an attribute of a session initiation protocol (SIP) message. Since this setting method follows a well-known technology, detailed description thereof will be omitted.

The first and second concentrators 112 and 113 are implemented as a device like a digital subscriber line access multiplexer (DSLAM). The first and second concentrators 112 and 113 multiplex signals received from a plurality of user terminals 111, and transmit to a high-speed backbone circuit.

The access router 114 performs routing between the second concentrator 113 and the edge router 115, and transmits a signal of the second concentrator 113 to the edge router 115. The edge router 115 transmits the signal from the access router 114 to the call agent 200 or to another communication party in another network.

The emergency center 116 makes an emergency call connection with the user terminal 111 under control of the emergency call agent 300, and provides a user with various required emergency services.

The call agent 200 is connected to a plurality of user terminals 111, and relays a call of the user terminal 111 to a proper communication party. Here, the call agent 200 relays an emergency call of the user terminal 111 to the emergency call agent 300.

Figure 3:
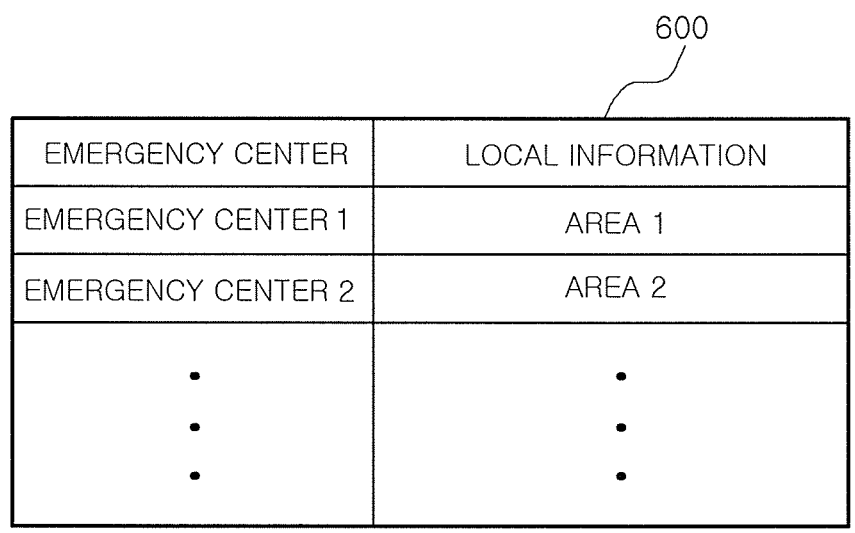
FIG. 3 is a position information table of emergency centers according to an embodiment of the present invention.

As illustrated in FIG. 3, the emergency call agent 300 includes emergency center position information table 600 storing local information of emergency centers. The emergency call agent 300 acquires position information of a user terminal sending an emergency call through the network management system 500, searches the emergency center position information table 600 to detect the emergency center 116 in the same area, and then makes the emergency call connection between the user terminal 111 and the emergency center 116.

The policy control system 400 includes a policy server 410, a subscriber database (DB) 420, and a dynamic host configuration protocol (DHCP) server 430. When the DHCP server 430 allocates an IP address to a specific user terminal 111, the policy server 410 generates position information of the user terminal 111 by mapping the allocated IP address and the local information to an identification (ID) of the corresponding user terminal 111. Thereafter, the DHCP server 430 stores the position information in a user terminal position information table 700 of FIG. 4, and simultaneously provides the position information to the network management system 500.

Figure 4:
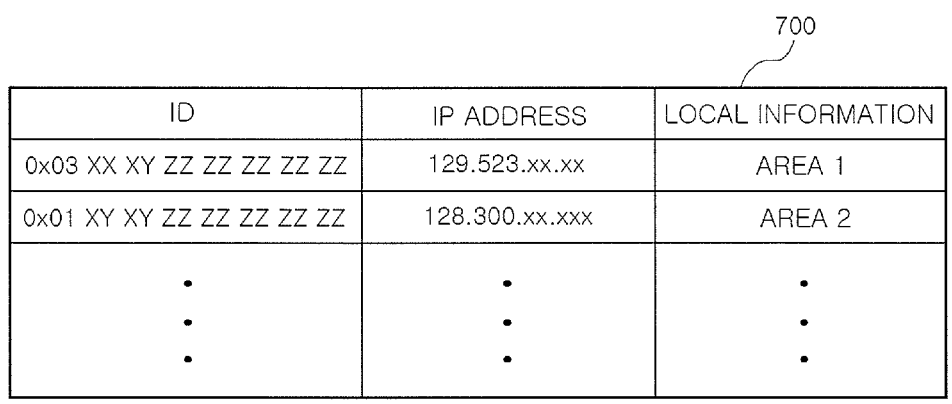
FIG. 4 is a position information table of user terminals according to an embodiment of the present invention.

The subscriber DB 420 stores therein the user terminal position information table 700 of FIG. 4, and policy information of every user terminal 111 connected to the policy server 410.

The DHCP server 430 allocates an IP address in response to an IP-address allocation request of the user terminal 111. Here, the user terminal 111 generates a "DHCP Request" message, and transmits to the DHCP server 430. The DHCP server 430 allocates an IP address in response to the received message. The "DHCP Request" message includes interface ID information of the first concentrator 112 directly connected to the user terminal 111, which is used as an ID of the user terminal 111.

The network management system 500 includes a call admission control (CAC) server 510, and a resource DB 520. The CAC server 510 stores position information of the user terminal 111 provided from the policy server 411 in the resource DB 520, and generates the user terminal position information table 700 as shown in FIG. 4. Also, the CAC server 510 provides position information of the corresponding user terminal 111 in response to a request of the emergency call agent 300. The CAC server 510 sets a priority of an emergency call service to the highest level. When the emergency call agent 300 requests a resource reservation for an emergency call, the CAC server 510 unconditionally allocates a bandwidth for the emergency call service through CAC resource management, thereby ensuring the QoS of the emergency call service.

The resource DB 520 stores therein the user terminal position information table 700 of FIG. 4, and resource information for each user terminal 111.

Figure 5:
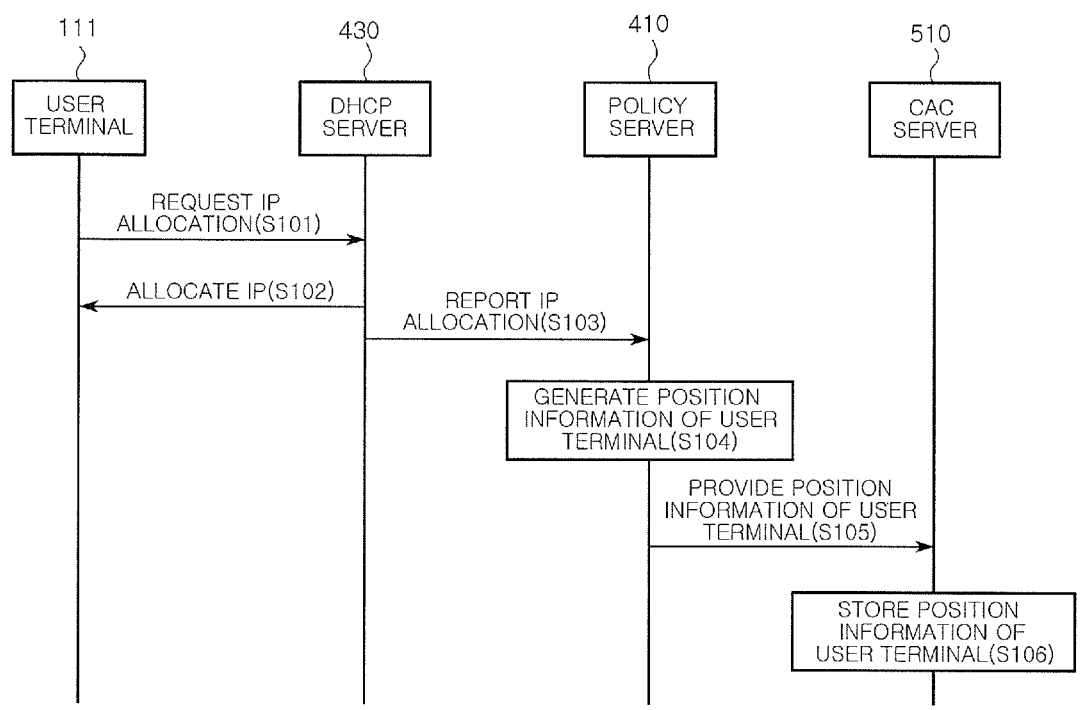
FIG. 5 is a timing diagram for explaining a method for acquiring user position information according to an embodiment of the present invention.

FIG. 5 is an operation timing diagram for explaining a method for acquiring user position information according to an embodiment of the present invention. Operations of FIG. 5 may be performed when a user terminal 111 receives an IP address.

In operation of S101, when accessing the Internet, a user terminal 111 sends a "DHCP Request" message to the DHCP server 430, and requests the DHCP server 430 to allocate an IP address. In operation S102, the DHCP server 430 allocates an IP address to the user terminal 111 in response to the request. In operation S103, the DHCP server 430 sends the IP address to the policy server 410.

In operation S104, the policy server 410 that manages the DHCP server 430 maps an ID of the user terminal 111 and local information to the IP address of the user terminal 11 to generate position information of the user terminal 111. In operation 105, the policy server 410 provides the CAC server 510 with the generated position information of the user terminal 111.

In operation S106, the CAC server 510 stores the position information of the user terminal 111 transmitted from the policy server 410 in the resource DB 520 within the network management system 500.

According to the present invention, whenever an IP address is allocated to a specific user terminal 111 by the DHCP server 430, position information of the corresponding user terminal 111 is automatically stored in the network management system 500, so that position of a user terminal sending an emergency call afterwards can be accurately detected.

Figure 6:
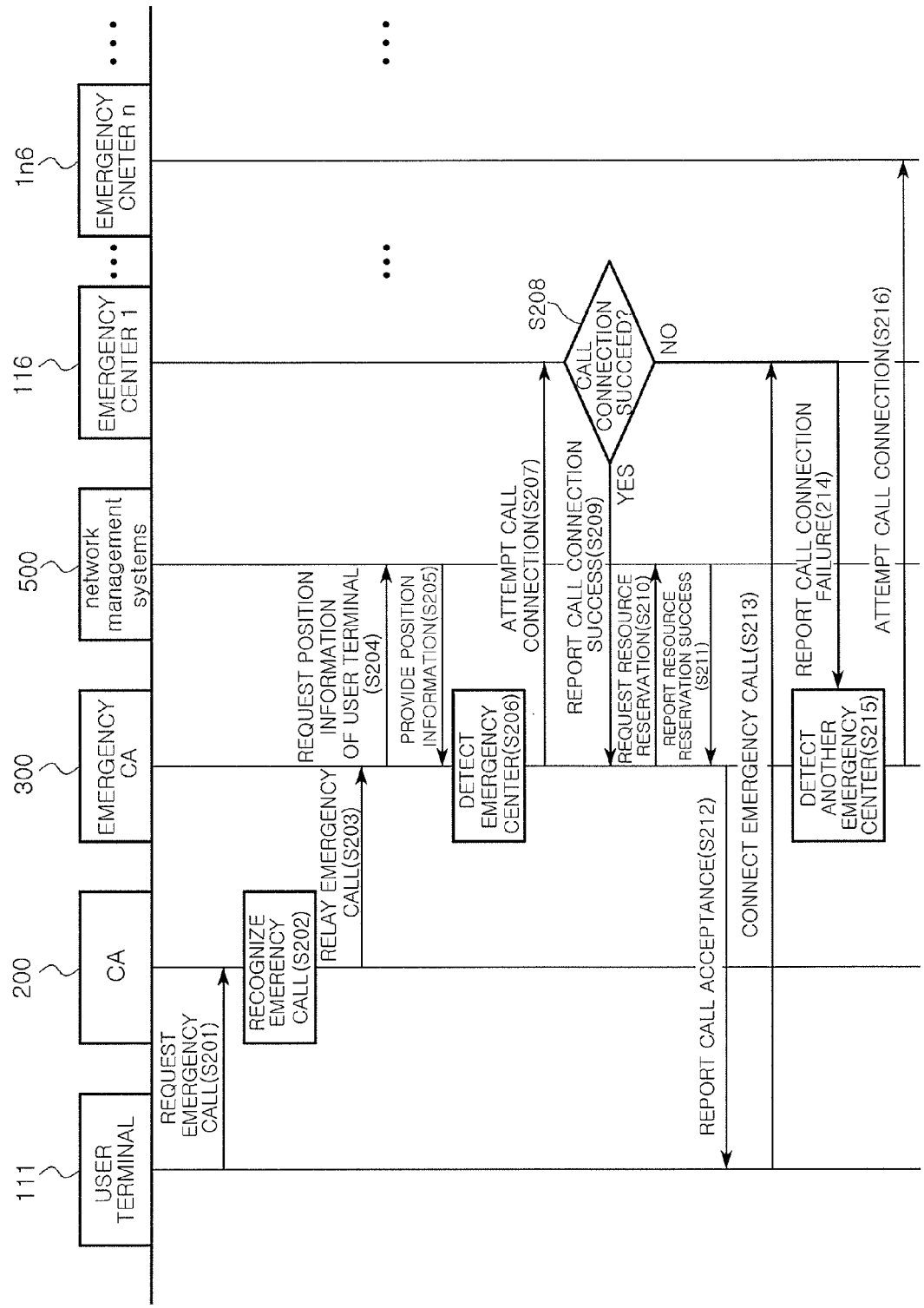
FIG. 6 is a timing diagram for explaining an emergency call service method in an IP network according to an embodiment of the present invention.

FIG. 6 is a timing diagram for explaining an emergency call service method in an IP network according to an embodiment of the present invention.

In operation S210, when a user requests an emergency call through a user terminal 111, the user terminal 111 sends an emergency call. Then, in operation S202, the call agent 200 connected to the corresponding user terminal 111 recognizes the emergency call, and relays the received emergency call to the emergency call agent 300 in operation S203.

In operation S204, the emergency call agent 300 analyzes the emergency call to acquire the IP address of the user terminal 111, and then requests position information of the user terminal 111 having the acquired IP address from the network management system 500.

In operation S205, the network management system 500 searches user-terminal position information stored in the resource DB to acquire the position information of the user terminal 111 having the corresponding IP address, and provides the acquired position information to the emergency call agent 300.

In operation S206, the emergency call agent 300 detects a position of the user terminal 111 on the basis of the received position information of the user terminal 111, and detects the nearest emergency center 116. In operation S207, the emergency call agent 300 attempts a call connection to the corresponding emergency center 116. When the corresponding emergency center 116 reports call connection failure to the emergency call agent 300 in operation S214, the emergency call agent 300 detects a new emergency center 1n6 according its own policy in operation S215, and attempts a call connection again in operation S216.

The operations of S215 and S216 are repetitively performed until the call connection to the emergency center 116 is made. However, if the call connection continuously fails despite a predetermined number of call-connection attempts, the emergency call agent 300 reports the call connection failure to the corresponding user terminal 111, and stops the call connection operation.

When the call connection with the corresponding emergency center 116 is made in operation S208, the emergency center 116 reports call connection success to the emergency call agent in operation S209. In operation S210, the emergency call agent 300 requests a resource reservation in an area between the user terminal 111 and the corresponding emergency center 116 from the network management system 500.

In operation S211, the network management system 500 preferentially performs the resource reservation of the area between the user terminal 111 and the corresponding emergency center 116 in response to the request of the operation S210, and reports resource reservation success to the emergency call agent 300. In operation S212, the emergency call agent 300 reports call acceptance to the corresponding user terminal 111.

In operation S213, the call connection 213 is established between the corresponding user terminal 111 and the emergency center 116.

According to embodiments of the present invention, even if the user terminal cannot register its position information to a base station, the position information of the user terminal can be accurately detected through the network management system, so that an emergency call service can be stably supported.

Accordingly, in the emergency call service system in the IP network and the method thereof according to the present invention, every user terminal having an IP address can be provided with an emergency call service, and the QoS of an emergency-call connection between the user terminal and the emergency center can be ensured through CAC resource management.

While the present invention has been shown and described in connection with the exemplary embodiments, it will be apparent to those skilled in the art that modifications and variations can be made without departing from the spirit and scope of the invention as defined by the appended claims.

What is claimed is:

1. An emergency call service system in an Internet Protocol (IP) network, comprising:

a policy control server for determining and generating position information of a user terminal by mapping an IP address and local information to an identification (ID) of the user terminal, wherein the position information is determined based upon interface ID information of a data transmission concentrator;

an emergency call agent for detecting, based upon the position information, a suitable emergency center for the user terminal sending an emergency call, and make an emergency-call connection between the user terminal and the emergency center;

a call agent for relaying the emergency call of the user terminal to the emergency call agent;

a network manager storing position information of the user terminal generated through the policy control server, provide the emergency call agent with the position information of the user terminal sending the emergency call, and perform a resource reservation for the emergency-call connection, wherein the policy control server comprises: a dynamic host configuration protocol (DHCP) server for allocating an IP address in response to an IP address allocation request message transmitted from the user terminal;

a policy server for generating position information of the user terminal by mapping the IP address and the local information to the ID of the user terminal, and provide the generated position information of the user terminal to the network manager; and a data storage unit for storing the position information of the user terminal generated through the policy server, and wherein the IP address allocation request message is a "DHCP request" message and wherein the ID of the user terminal is the interface ID of the concentrator.

2. The system of claim 1, wherein the network manager comprises:

a data storage unit for storing position information of the user terminal; and a call admission control (CAC) server for detecting the position of the user terminal sending the emergency call on the basis of the position information of the user terminal to inform the emergency call agent of the detected position, and perform a resource reservation for the emergency-call connection.

3. The system of claim 1, wherein the emergency call agent is configured to make an emergency call connection between the user terminal and the emergency center after the resource reservation between the user terminal and the emergency center is performed through the network manager.

4. The system of claim 1, wherein the emergency call agent includes local information of the emergency center.

5. An emergency call service method in an Internet Protocol (IP) network comprising an emergency call agent connected to a plurality of emergency centers and a call agent, a policy control server for generating position information of a user terminal, and a network manager for storing the position information of the user terminal and provide call admission control (CAC), the method comprising:

determining and generating, at the policy control server, position information of the user terminal by mapping an IP address and local information to an identification (ID) of the user terminal, wherein the position information is determined based upon interface ID information of a data transmission concentrator, and storing the generated position information in the network manager;

relaying, at the call agent, an emergency call of the user terminal to the emergency call agent;

detecting, at the emergency call agent, a position of the user terminal on the basis of the position information of the user terminal stored in the network manager, and determining an emergency center suitable for the user terminal; and making, at the emergency call agent, an emergency call connection between the user terminal and the emergency center wherein the policy control server comprises:

a dynamic host configuration protocol (DHCP) server for allocating an IP address in response to an IP address allocation request message transmitted from the user terminal;

a policy server for generating the position information of the user terminal by mapping the IP address and the local information to the ID of the user terminal, and provide the generated position information of the user terminal to the network manager; and a data storage unit for storing therein the position information of the user terminal, wherein the IP address allocation request message is a "DHCP request" message and wherein the ID of the user terminal is the interface ID of the concentrator.

6. The method of claim 5, wherein the detecting of the position of the user terminal comprises:

requesting, at the emergency call agent, the position information of the user terminal sending the emergency call from the network manager;

acquiring, at the network manager, the requested position information of the user terminal, and providing the acquired position information to the emergency call agent; and detecting, at the emergency call agent, the suitable emergency center for the user terminal in response to the position information of the user terminal.

7. The method of claim 5, wherein the making of the emergency call connection comprises;

attempting, at the emergency call agent, a call connection to the emergency center;

requesting, at the emergency call agent, a resource reservation from the network manager when the call connection to the emergency center is made; and connecting, at the emergency call agent, the emergency call between the user terminal and the emergency center when the resource reservation through the network manager is completed.

8. The method of claim 5, wherein the generating of the position information comprises:

allocating, at the policy control server, the IP address in response to an IP address allocation request of the user terminal;

generating, at the policy control server, position information of the user terminal by mapping the IP address and the local information to the ID of the user terminal;

providing, at the policy control server, the position information of the user terminal to the network manager; and storing, at the network manager, the position information of the user terminal.

9. The system of claim 5, wherein the network manager comprises:

a data storage unit for storing therein the position information of the user terminal; and a call admission control (CAC) server for detecting the position of the user terminal sending the emergency call on the basis of the position information of the user terminal to inform the emergency call agent of the detected position, and perform a resource reservation for the emergency-call connection.

* * * * *